UNITED STATES PATENT OFFICE.

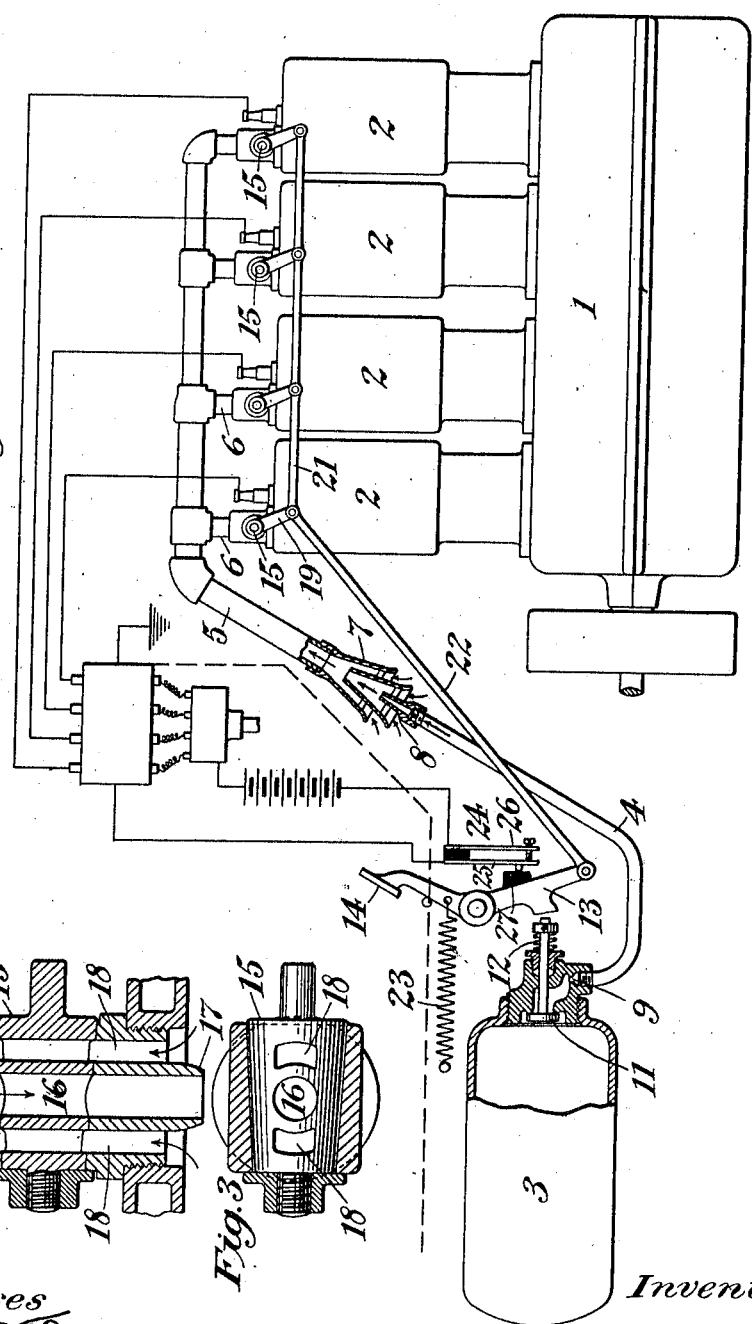

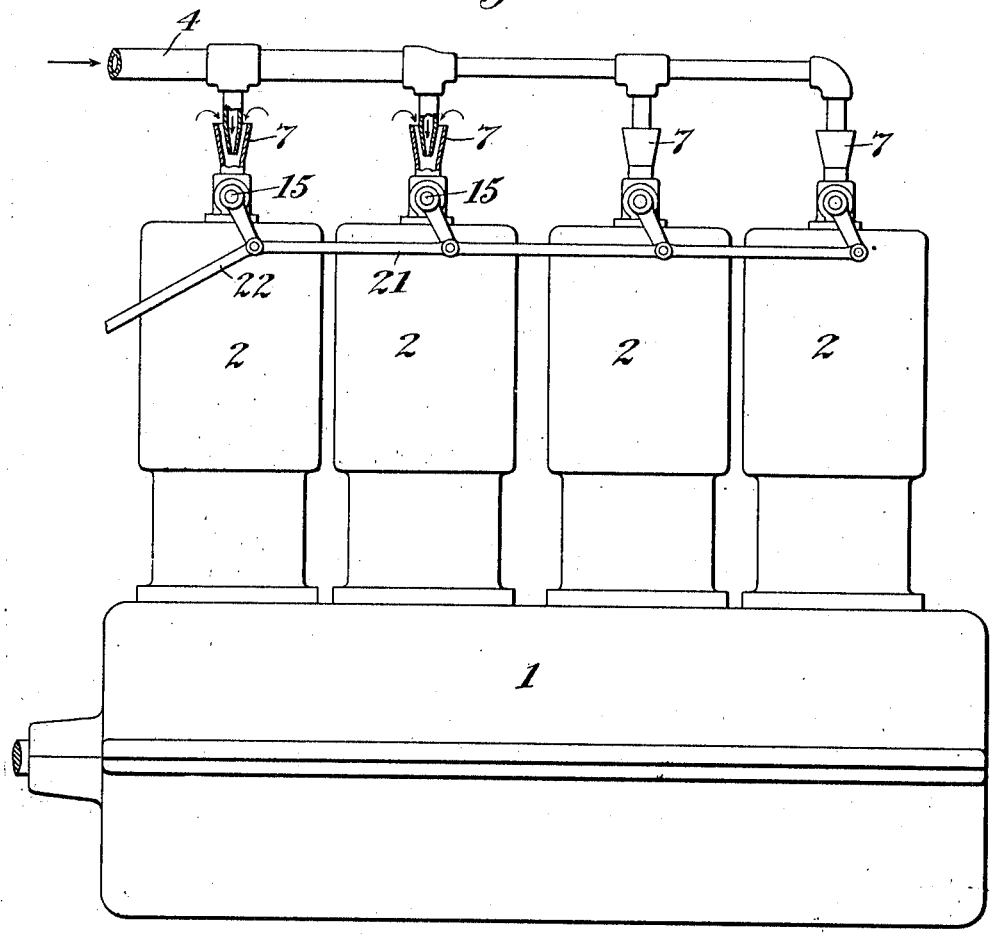

CLYDE J. COLEMAN, OF NEW YORK, N. Y., ASSIGNOR TO CONRAD HUBERT, OF NEW YORK, N. Y.

AUTOMATIC ENGINE-STARTER.

993,030.          Specification of Letters Patent.      Patented May 23, 1911.

Application filed August 12, 1907. Serial No. 388,272.

*To all whom it may concern:*

Be it known that I, CLYDE J. COLEMAN, a citizen of the United States of America, residing in the borough of Manhattan, in the city of New York, county of New York, and State of New York, have invented certain new and useful Improvements in Automatic Engine-Starters, of which the following is a specification, reference being had therein to the accompanying drawings, forming a part thereof.

My invention relates to starting devices, for internal combustion engines, of the type in which an inflammable mixture is introduced into the cylinder or cylinders of the engine and is ignited, the combustion and expansion of the mixture affording the energy by which the engine is started. In order to render such devices automatic in action it has heretofore been proposed to utilize the expansive force of air stored under pressure to secure the introduction of the mixture into the cylinder, and for this purpose a tank of compressed air has been used, the air being mixed with a sufficient amount of fuel prior to its admission to the cylinder.

The object of the present invention is to produce an engine starter in which a supply of compressed combustible gas may be utilized as the means for automatically introducing the charge into the cylinder. As the volume of combustible gas in an inflammable mixture is only about $\frac{1}{10}$ or less of the volume of air this arrangement permits the use of a storage receptacle of less size than is necessary where the air is the constituent of the inflammable mixture which is stored, particularly where acetylene gas is used, as this gas, by the use of absorbent materials, can be stored in great bulk in a small space.

The present arrangement has the further advantage that the formation of an inflammable mixture requires only the addition of a suitable volume of air to the combustible gas, an operation which can be readily and accurately performed by a comparatively simple apparatus regardless of temperature or other conditions which sometimes interfere with the formation of a suitable mixture by the addition of liquid fuel to air.

The invention includes, in combination with the cylinder or cylinders of an internal combustion engine provided with an ignition system, a starting device in which a receptacle for storing compressed elastic fluid is connected with the cylinder and means provided and operating automatically to form a combustible mixture during the flow of fluid through these connections, and concurrently actuated mechanisms being provided for venting the cylinder and for blowing the combustible mixture into the cylinder by the pressure of the stored fluid and also for rendering the ignition system non-operative during the introduction of the combustible mixture into the cylinder. More specifically, it is proposed to use, in combination, as the mixture producing means, an injector in which air enters by reason of atmospheric pressure into the area of lower pressure produced by the flow of gas through the injector from the receptacle.

The invention includes also certain more specific details of construction which will be noted hereinafter and set forth in the claims.

I will now describe the embodiment of my invention illustrated in the accompanying drawings, and will hereinafter point out my invention in claims.

Figure 1 is a diagrammatic representation of a starting device embodying the present invention, the parts being shown partly in side elevation and partly in section. Fig. 2 is a detail view in vertical section of the combined inlet and vent valve, and Fig. 3 is a horizontal section of the same. Fig. 4 is a detail view showing a modified construction and location of the injectors.

In the drawings the engine is indicated generally by the reference numeral 1, and has four cylinders 2. The gas receptacle is a cylindrical tank 3 in which acetylene or other combustible gas is stored under pressure. The connections between the gas receptacle and the cylinders comprise a gas-supply pipe 4 and a pipe 5 for conducting the inflammable mixture to the cylinders. The pipe 5 has branches 6 connecting it with the several cylinders. The injector 7 is shown in Fig. 1 as of compound form so as to admit the large bulk of air necessary, and the gas pipe 4 terminates in a restricted nozzle 8 forming part of the injector. A constricted passage 9 at the other end of the gas pipe controls the flow of gas from the receptacle 3, but in its passage to the injector the gas expands and it issues with great velocity from the nozzle 8 so as to draw air in with it and form an inflammable mixture in the pipe 5.

The flow of gas from the receptacle is normally prevented by a valve 11 held closed by the pressure of the gas and by a spring 12. A lever 13 is pivoted at a convenient point and terminates in a pedal 14. When the pedal is pressed the lever engages and opens the valve 11 to throw the starting device in operation.

As the inflammable mixture is introduced to the cylinders through ports provided specially for this purpose it is necessary to provide valves to close these ports during the normal operation of the engine. It is necessary also to provide vents to facilitate the entrance of the mixture by permitting the escape of the contents of the cylinders. These two functions are combined at each cylinder in a single valve 15 which is provided as shown in Figs. 2 and 3, with an inlet passage 16 communicating with a nozzle 17, and two lateral vent passages 18. These passages are all opened and closed simultaneously by movement of the valve.

Each valve 15 is provided with an arm 19 connected to a link 21, and the link 21 is connected, by a link 22, with the pedal lever 13, so that all the valves are opened and closed simultaneously by the operation of the pedal. A spring 23 tends to return the pedal to normal position and close the valves.

In order that the mixture may not be ignited prematurely during its introduction to the cylinders, means are provided for automatically throwing the igniting devices out of operation at this time. The engine of the drawings is provided with an electrical igniting apparatus of ordinary form, which is represented conventionally in Fig. 1. In the primary circuit of this apparatus is a switch 24 comprising a fixed contact piece 26 and a resilient contact spring 25 which tends normally to spring away from the contact piece 26. When the pedal lever 13 is in normal position a block of insulating material 27 on the lever engages the contact spring 25 and holds it in contact with the contact piece 26, but when the pedal is pressed to operate the starting device the spring 25 is released and the circuit is thereby opened so as to prevent operation of the igniting devices.

The starting device is preferably used in connection with engines having four or more cylinders, as in such engines one or another of the pistons is always in position to make its working stroke. When the pedal 14 is pressed the cylinders are all filled with inflammable mixture in the manner above described, the valves being held open by the operator as long as is necessary to insure this. Upon the release of the pedal the igniting devices are thrown into operation, and an explosion occurs in whichever cylinder the piston is in position to make its working stroke. This explosion starts the rotation of the crank shaft and the normal operation of the engine is thereby initiated.

The starting device may be used repeatedly until the supply of compressed gas is exhausted, and its operation is entirely automatic upon the operation of the pedal 14. The ignition-timing devices should be shifted, before using the starting device, into position to give a delayed ignition, so that ignition may occur in a cylinder in which the piston has begun its down-stroke, as otherwise the engine may be started in the wrong direction.

The invention is applicable to two-cycle engines, and when so used may be applied successfully to two-cylinder engines and made to start the engine in either direction according to the position of the ignition-timing device.

In the modified form shown in Fig. 4 separate injectors are used for the several cylinders, these injectors being directly connected to the valves 15 and being connected with the gas pipe 4 by short branches therefrom.

It is obvious that various modifications may be made in the constructions shown in the drawings and herein particularly described without departure from the nature and scope of the invention.

I claim:—

1. A starting device for internal combustion engines comprising, in combination with the cylinder of the engine, a receptacle containing compressed combustible gas, fluid-carrying connections between the gas receptacle and the cylinder, an injector interposed in such connections and adapted to introduce air into the gas to form a combustible mixture, a valve interposed between the gas receptacle and the injector, a combined mixture inlet and vent valve interposed between the injector and the cylinder and provided with an inlet passage controlling the flow of combustible mixture and also provided with a passage affording a vent for the contents of the cylinder and permitting the combustible mixture to be blown into the cylinder by pressure of the compressed gas contained in the gas receptacle, such passages being adapted to be opened and closed concurrently by the operation of the valve, means for opening and closing the valves concurrently, an ignition system for the engine, and means for rendering the ignition system non-operative during the time that such valves are open and permitting the operation of the ignition system during the time that such valves are closed.

2. A starting device for internal combustion engines comprising, in combination with the cylinder of the engine, a receptacle for storing compressed elastic fluid, fluid-carrying connections between the receptacle and the cylinder, means for forming a combustible mixture during the flow of fluid through such connections, an outlet valve for the fluid receptacle, a combined mixture inlet and vent valve provided with an inlet passage controlling the flow of combustible mixture and also provided with a passage affording a vent for the contents of the cylinder when the combustible mixture is blown into the cylinder by the pressure of compressed fluid stored in the receptacle, such passages being adapted to be opened and closed concurrently by the operation of the valve, an ignition system for the engine including electric contact terminals, and means for concurrently opening and closing the contact terminals and the said valves.

3. A starting device for internal combustion engines comprising, in combination with the cylinder of the engine, a receptacle for compressed combustible gas, fluid-carrying connections between the gas receptacle and the cylinder, an injector interposed in such connections and adapted to introduce air into the gas to form a combustible mixture, a valve interposed between the gas receptacle and the injector, a valve interposed between the injector and the cylinder, an ignition system for the engine including electric contact terminals, and means for concurrently opening and closing the contact terminals and the said valves.

In testimony whereof I affix my signature in presence of two witnesses.

CLYDE J. COLEMAN.

Witnesses:
ALBERT V. T. DAY,
BERNARD COWEN.